United States Patent [19]

Ludwig

[11] Patent Number: 4,848,939
[45] Date of Patent: Jul. 18, 1989

[54] BEARING SHIM
[75] Inventor: David A. Ludwig, Mt. Clemens, Mich.
[73] Assignee: Ring & Pinion Sales, Inc., Detroit, Mich.
[21] Appl. No.: 632,064
[22] Filed: Jul. 18, 1984
[51] Int. Cl.⁴ .................. F16C 33/00; F16B 43/00
[52] U.S. Cl. .................... 384/626; 403/390; 411/535
[58] Field of Search .............. 308/244; 403/13, 14, 403/365–380, 390, 391; 74/494, 405; 384/626; 411/535, 536

[56] References Cited

U.S. PATENT DOCUMENTS

| | | | |
|---|---|---|---|
| 700,014 | 5/1902 | Buck | 308/244 |
| 1,225,113 | 5/1917 | Davie | 308/244 X |
| 1,556,940 | 10/1925 | Leis | 308/244 X |
| 1,729,286 | 9/1929 | Elfring | 308/244 X |
| 1,736,998 | 11/1929 | Darrach, Jr. | 308/244 |
| 2,542,405 | 2/1951 | Fink | 308/237 |
| 2,613,571 | 10/1952 | Herman | 308/244 X |
| 2,980,572 | 4/1961 | Bagdon et al. | 154/116 |
| 3,730,600 | 5/1973 | Degnan | 308/244 |
| 4,336,969 | 6/1982 | Kahlert et al. | 308/61 |
| 4,353,606 | 10/1982 | Bitsch et al. | 308/189 |

FOREIGN PATENT DOCUMENTS 76715  6/1981  Japan .................... 308/244

Primary Examiner—Thomas R. Hannon
Attorney, Agent, or Firm—Gifford, Groh, Sheridan, Sprinkle and Dolgorukov

[57] ABSTRACT

A bearing shim comprising a first end plate, a second end plate and a plurality of spacer elements disposed therebetween. The first end plate includes an axially elongated annular rib adapted to be received within apertures in the spacers and the other end plate. Preferably, the annular rib peripherally circumscribes a bore within the first end plate adapted to receive a rotatably mounted axle therethrough.

7 Claims, 1 Drawing Sheet

BEARING SHIM

BACKGROUND OF THE INVENTION

I. Field of the Present Invention

The present invention relates generally to shims which prevent axial displacement of rotatable, shaft mounted components within a housing, and more particularly to side carrier bearing shims used in the differential gear mechanism of a motor vehicle.

II. Description of the Prior Art

In the construction of repair of differential gear cases for motor vehicles, proper meshing of the gears must be mainted in order to avoid excess play which can cause deterioration or destruction of the gear teeth. In addition, the engagement between the gear teeth should not be so tight as to cause undue friction, stress and resistance to turning of the gears. As a result, it is often necessary to include side carrier bearing shims extending between the differential housing wall and the axle shaft mounted bearing race adjacent the ring gear. Such shims fit over the axle and position the ring gear for proper engagement with a pinion gear.

The previously known bearing shims are usually in the form of annular spacers, and the spacers are sold in sets wherein each spacer has a different axial length. While not all the shims in each set will be used in providing the proper clearance in the particular differential construction, typically only one shim having the proper axial length will be used, and the remainder of the shims of the set will be discarded. Since the shims are subjected to shearing stresses and torsional moments, it has not heretofore been possible to use a combination of the remaining shims of the set to form a bearing shim in another differential gear case. In particular, using a plurality of narrow shims to form a spacer of proper length has not been practical because the stress and strain exerted upon the shims would cause twisting and destruction of the narrower shims. As a result, the unused shims are discarded to avoid repeated repair of the differential gear casing structure.

Unfortunately, the previously known shim kits require the production and purchase of more pieces than is necessary to actually construct a differential case with appropriate clearance between the ring gear and pinion gear. Thus, such kits are substantially more expensive than would be required to construct a shim which is particularly necessary for construction or repair of a particular differential casing. On the other hand, since construction and installation tolerances can vary throughout a relatively wide range, a plurality of differently sized shims must be provided in each bearing shim kit.

SUMMARY OF THE PRESENT INVENTION

The present invention overcomes the above mentioned disadvantages by providing bearing shim construction in which the length can be varied as desired and which avoids deterioration experienced when previously known shims were combined to form a spacer of proper length. The bearing shim of the present invention generally comprises a first end plate having an axially elongated annular rib spaced radially inwardly from the outer periphery of the plate and extending around a central aperture adapted to receive the axle therethrough, and a second end plate having an aperture adapted to receive the annular rib of the first plate. In addition, the bearing shim can include additional spacer elements having central apertures adapted to receive the annular rib of the first plate therethrough while positioned between the first and second end plates. Such a construction prevents twisting, distortion and deterioration of the narrow spacers combined to form a shim whose length can be incrementally changed as desired.

Preferably, the second plate is substantially the same length as the length of the axially elongated annular rib of the first plate so that the two plates pressed together form a bearing shim of a predetermined minimum length. In addition, a plurality of narrow spacers are provided and preferably the total length of all the spacers combined is less than the axial length of the annular rib. Moreover, it is preferable that the length of the second plate and the length of the first plate each be approximately one half of the minimum predetermined thickness desired for the bearing shim and that the annular rib be at least as long as the length of the first and second plates.

Thus unlike previously known bearing shims, the present invention provides means for employing a plurality of differently sized shims to form bearing shim structure of a desired length. In addition, such a construction permits the production and sale of a shim kit which has substantially fewer pieces than previously known shim kits without sacrificing the variety of shim lengths available for use in the kit. In addition, the shim construction avoids the twisting and deterioration of shim parts as previously occurred when shims having different lengths were combined together to form a shim of proper length. These and other advantages will be discussed in greater detail hereinafter.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout the views and in which.

DETAILED DESCRIPTION OF THE PREFERRED EMBODIMENT OF THE PRESENT INVENTION

Figure 1:
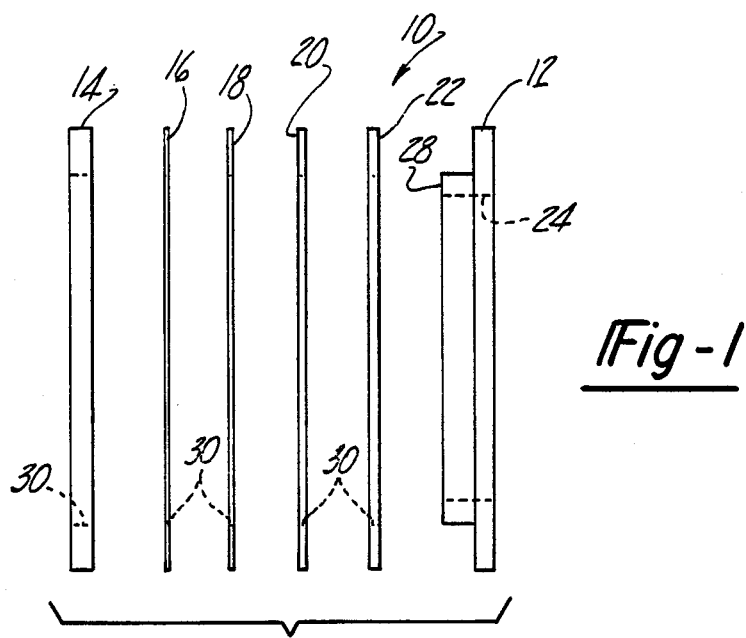
FIG. 1 is an exploded side plan view of bearing shim construction according to the present invention.
Figure 2:
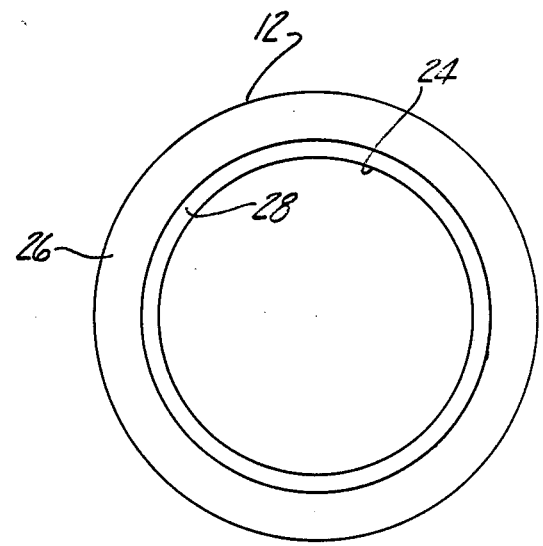
FIG. 2 is a front plan view of portion of the shim shown in FIG. 1.
Figure 3:
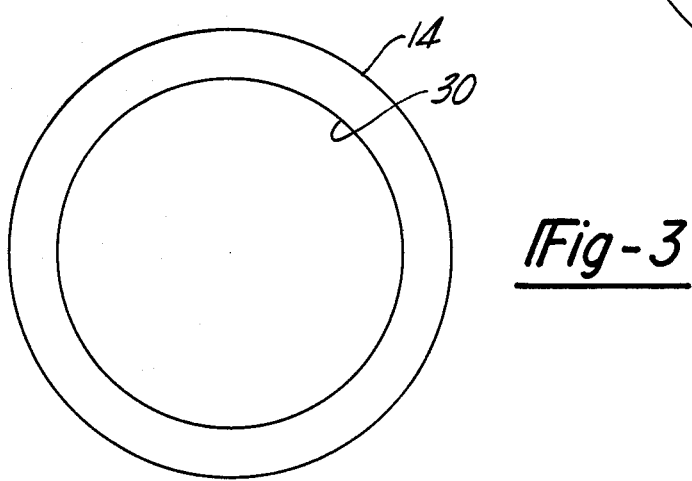
FIG. 3 is a front plan view of another portion of the shim construction shown in FIG. 1.

Referring first to FIG. 1, the side carrier bearing shim 10 according to the present invention is thereshown comprising a first plate 12, a second plate 14 and a plurality of spacers 16, 18, 20 and 22. The plate 12 includes a central bore 24 (see FIG. 2) adapted to receive an axle (not shown) therethrough. Thus, the plate 12 includes an annular flange 26 forming the main body portion of the plate 12. In addition, the plate 12 includes an axially elongated annular rib 28. In the preferred embodiment shown in the drawing, the rib 28 peripherally circumscribes the central bore 24. The second plate 14 includes central bore 30 (As best shown in FIG. 3) adapted to receive the annular ribe 28 therethrough. Thus the second plate 14 can abut against the annular flange 26 of the first plate 12.

The axial length of the plate 14 is preferably substantially the same as the axial length of the annular flange 26 of plate 12. In addition, the axial length of the annular rib 28 is preferably at least as long as the axial length end plate 14. With the end plate 14 slid over the annular rib 28 against annular flange 26 of plate 12, the bearing shim 10 formed thereby has a total axial length equal to a predetermined minimum axial length of a bearing shim.

Each of the spacers 16, 18, 20 and 22 all comprise annular rings having a central bore 30 adapted to receive the annular rib 28. However, each spacer 16, 18, 20 and 22 has a different axial length. However, it is preferable that the total axial length of all of the spacers 16, 18, 20 and 22 is less than the axial length of the rib 28 so that the end plate 14 can be received over at least a portion of the rib 28 when spacers are used to form a wide bearing shim 10. Thus the rib 28 stably supports and avoids deterioration of spacers 16, 18 20 and 22 which are substantially narrower than the end plates 12 and 14.

For example, the particular shim kit constructed in accordance with the present invention can now be discussed as a non-limiting example which does not restrict the scope of the present invention. The plate 12 and the plate 14 are formed each with an axial length substantially equal to 1/10th of an inch. Thus, when the first and second plates are placed together without any spacers therebetween, the total axial length of the shim is approximately 0.205 inch. In addition, the annular rib 28 has an axial length of substantially 0.1 inch and the end plate 14 is stably supported upon the rib 28. Moreover, in this preferred embodiment of the kit, spacer 16 has an axial length of 0.005 inch, spacer 18 has a length of 0.010 inch the spacer 20 has a length of 0.020 inch and the spacer 22 has a length of 0.030 inch. Thus, the axial length of the shim 10 formed by combining one or more of the shims 16–22 can be varied by increments of 0.005 inch between 0.205 inch and 0.265 inch. Nevertheless, since the plates 12 and 14 are substantially thicker than the spacers 16–22, and they enclose the spaces therebetween, the spacers are protected by the plates 12 and 14. Moreover, in conjunction with the rib 28 which increases the rigidity of the flange 26 of plate 12 as well as the entire shim structure, the end plates prevent the spacers 16–22 from being subjected to the shear stresses and distortions which have been encountered with previously known shims arranged in a side by side arrangement. Since the spacers are protected by the end plates, they can be simply constructed at a variety of predetermined axial lengths. As a result, they are inexpensive to produce and can be discarded with substantial economic waste. Moreover, unlike previously known spacers, any spacers which remain unused in a particular application can be saved and stored for use with other spacer plates 12 and 14. In addition, the present invention substantially reduces the amount of parts which must be included in a shim kit to form a bearing shim of a particular axial length needed without knowing the particular length needed before assembly. In addition, the end plates are easy to construct, can be manufactured of a single standard size while spacers can be manufactured in various sizes. Moreover, since spacers can be combined together for forming a single bearing shim , the number of spacers which must be manufactured in order to produce an incrementally adjustable shim through a range of variable discrete axial lengths in each kit is substantially reduced.

Having thus described my invention, many modifications thereto will become apparent to those skilled in the art to which it pertains without departing from the scope and spirit of the present invention as defined in the appended claims. For example, although the bearing shim of the preferred embodiment comprises a side carrier bearing shim for use in the differential casing of a motor vehicle, it will be understood that a bearing shim constructed in accordance with the present invention can be applied to wide variety of other devices in which axial spacing between elements is desired.

What is claimed is:

1. A bearing shim comprising:
   a first plate having a central bore adapted to receive an axle therethrough,
   an annular rib secured to and extending axially outwardly from one side of said plate, said rib being concentric with said bore,
   a second plate having a central bore dimensioned to receive said rib therein from one side of said second plate, said one side of said first plate facing said one side of said second plate,
   at least one annular, planar spacer having a predetermined thickness, said spacer having a bore dimensioned to receive said rib therethrough so that, with said spacer positioned around said rib and sandwiched in between said facing sides of said first and second plates, said spacer spaces said facing sides of said first and second plates apart from each other by said predetermined thickness.

2. The invention as defined in claim 1 wherein said annular rib has an axial length and wherein the thickness of said at least one spacer is less than the axial length of said annular rib.

3. The invention as defined in claim 1 wherein said annular rib has an axial length and wherein said at least one spacer comprises a plurality of spacers and wherein the combined thicknesses of said plurality of spacers is less than the axial length of said annular rib.

4. The invention as defined in claim 1 wherein said annular rib peripherally circumscribes said central bore.

5. The invention as defined in claim 1 wherein said second plate has an axial length substantially the same as the axially length of said rib.

6. The invention as defined in claim 1 and comprising a second annular, planar spacer having a second predetermined thickness, said second spacer having a throughbore dimensioned to receive said rib therethrough, said second predetermined thickness being different from said first mentioned predetermined thickness.

7. The invention as defined in claim 1 wherein said first and second plates are annular and planar in shape.

* * * * *